United States Patent
Birnkrant et al.

(10) Patent No.: US 9,845,731 B2
(45) Date of Patent: Dec. 19, 2017

(54) SELF-MODULATED COOLING ON TURBINE COMPONENTS

(71) Applicant: United Technologies Corporation, Hartford, CT (US)

(72) Inventors: Michael J. Birnkrant, Kenilworth, NJ (US); Carey Clum, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 212 days.

(21) Appl. No.: 14/749,438

(22) Filed: Jun. 24, 2015

(65) Prior Publication Data

US 2016/0084167 A1    Mar. 24, 2016

Related U.S. Application Data

(60) Provisional application No. 62/054,734, filed on Sep. 24, 2014.

(51) Int. Cl.
| | | |
|---|---|---|
| G05D 23/02 | (2006.01) | |
| F02C 7/18 | (2006.01) | |
| (Continued) | | |

(52) U.S. Cl.
CPC ............ *F02C 7/20* (2013.01); *F01D 5/182* (2013.01); *F01D 5/186* (2013.01); *F01D 9/041* (2013.01);
(Continued)

(58) Field of Classification Search
CPC ..... G05D 23/02–23/10; F05D 2260/20; F05D 2260/202; F05D 2260/203; F05D 2260/204; F05D 2300/134; F05D 2300/5021; F23R 3/06; F23R 2900/03041–2900/03044; F01D 5/085; F01D 5/087; F01D 5/088; F01D 5/182; F01D 5/183; F01D 5/186;
(Continued)

(56) References Cited

U.S. PATENT DOCUMENTS

| | | | |
|---|---|---|---|
| 5,514,360 A | * | 5/1996 | Sleight .................. C01G 41/00 423/594.12 |
| 5,919,720 A | | 7/1999 | Sleight et al. |

(Continued)

FOREIGN PATENT DOCUMENTS

| | | |
|---|---|---|
| EP | 1584789 | 10/2005 |
| EP | 1936468 | 6/2008 |

(Continued)

OTHER PUBLICATIONS

Extended European Search Report dated Jan. 28, 2016 in European Application No. 15177726.5.

*Primary Examiner* — Gerald L Sung
*Assistant Examiner* — Rene Ford
(74) *Attorney, Agent, or Firm* — Snell & Wilmer, L.L.P.

(57) ABSTRACT

Systems and methods are disclosed herein for passively managing cooling air in a gas turbine engine. A cooling air supply line may supply cooling air to a component in the gas turbine engine. A metering coupon may have a negative coefficient of thermal expansion. The metering coupon may allow more airflow through the metering coupon and through the component in response to an increase in temperature.

20 Claims, 8 Drawing Sheets

(51) Int. Cl.
  *F01D 25/12* (2006.01)
  *F01D 5/18* (2006.01)
  *F02C 7/20* (2006.01)
  *F01D 9/04* (2006.01)
  *F01D 11/08* (2006.01)
  *F02C 7/25* (2006.01)
  *F01D 11/14* (2006.01)
  *F01D 11/24* (2006.01)
  *F23R 3/00* (2006.01)
  *F23R 3/06* (2006.01)
  *F23R 3/26* (2006.01)

(52) U.S. Cl.
  CPC .............. *F01D 11/08* (2013.01); *F01D 11/14* (2013.01); *F01D 11/24* (2013.01); *F01D 25/12* (2013.01); *F02C 7/18* (2013.01); *F02C 7/25* (2013.01); *F23R 3/002* (2013.01); *F23R 3/06* (2013.01); *F23R 3/26* (2013.01); *G05D 23/02* (2013.01); *G05D 23/021* (2013.01); *G05D 23/022* (2013.01); *F05D 2220/32* (2013.01); *F05D 2240/12* (2013.01); *F05D 2240/30* (2013.01); *F05D 2240/35* (2013.01); *F05D 2240/55* (2013.01); *F05D 2260/202* (2013.01); *F05D 2300/134* (2013.01); *F05D 2300/16* (2013.01); *F05D 2300/5021* (2013.01); *F05D 2300/50212* (2013.01); *F23R 2900/03042* (2013.01)

(58) Field of Classification Search
  CPC .......... F01D 5/187; F01D 5/188; F01D 9/065; F01D 25/005
  USPC ................... 236/93 A, 99 J, 101 R, 102, 103
  See application file for complete search history.

(56) References Cited

U.S. PATENT DOCUMENTS

| | | | |
|---|---|---|---|
| 6,485,255 B1* | 11/2002 | Care | F01D 5/187 415/12 |
| 7,441,599 B2 | 10/2008 | Hermes et al. | |
| 8,142,874 B1* | 3/2012 | Jefferson | B64G 1/22 428/116 |
| 2006/0263217 A1* | 11/2006 | Spanks, Jr. | F01D 5/186 416/97 R |
| 2007/0036942 A1 | 2/2007 | Steele | |
| 2009/0226327 A1* | 9/2009 | Little | F01D 5/082 416/96 A |
| 2010/0025253 A1* | 2/2010 | Yoshioka | C25D 11/06 205/50 |
| 2013/0243997 A1* | 9/2013 | Spadaccini | B32B 1/06 428/116 |
| 2014/0099183 A1* | 4/2014 | Morgan | F01D 5/18 415/1 |
| 2016/0281510 A1* | 9/2016 | Rockstroh | F01D 5/14 |

FOREIGN PATENT DOCUMENTS

| | | |
|---|---|---|
| EP | 2423346 | 2/2012 |
| EP | 2716867 | 4/2014 |

* cited by examiner

SELF-MODULATED COOLING ON TURBINE COMPONENTS

CROSS-REFERENCE TO RELATED APPLICATIONS

This application is a nonprovisional of, and claims priority to, and the benefit of U.S. Provisional Application No. 62/054,734, entitled "SELF-MODULATED COOLING ON TURBINE COMPONENTS," filed on Sep. 24, 2014, which is hereby incorporated by reference in its entirety.

GOVERNMENT LICENSE RIGHTS

These inventions were made with government support under contract number N00014-12-C-0434 awarded by the United States Navy. The Government has certain rights in the inventions.

FIELD

The disclosure relates generally to gas turbine engines, and more particularly to cooling systems in gas turbine engines.

BACKGROUND

Gas turbine engines typically comprise many components in high temperature environments. Components in the turbine section of a gas turbine engine may experience temperatures of 1,600° Celsius (2,900° F.) or higher. The components may be cooled with cooling air from the compressor section of the gas turbine engine to prevent damage to the components. The components may include channels that direct the cooling air through small film holes. However, as the components increase in temperature, the component material may expand, which may decrease the size of the channels or film holes and limit the amount of cooling air available to cool the component.

SUMMARY

A cooling system in a gas turbine engine may comprise a component in the gas turbine engine, a cooling air supply line configured to supply cooling air to the component, and a metering coupon having a negative coefficient of thermal expansion.

In various embodiments, the metering coupon may be located within the cooling air supply line. The metering coupon may be located within a film hole in the component. The component may comprise at least one of a vane, a blade, a blade outer air seal, or a combustor panel. The metering coupon may span an entire cross-section of the cooling air supply line. The metering coupon may be coated on a film hole in the component. The metering coupon may be configured to passively manage cooling air supplied to the component. The metering coupon may comprise at least one of nickel or zirconium tungstate.

A gas turbine engine component may comprise a film hole and a material having a negative coefficient of thermal expansion located within the film hole.

In various embodiments, the material may comprise at least one of nickel or zirconium tungstate. The material may be configured to passively manage cooling air flowing through the film hole. The material may be coated on the film hole. The material may span an entire cross-section of the film hole. The gas turbine engine component may be at least one of a turbine vane, a turbine blade, a blade outer air seal, or a combustor panel.

A gas turbine engine may comprise a component in the gas turbine engine, a cooling air supply line in fluid communication with the component, and a metering coupon having a negative coefficient of thermal expansion. The metering coupon may be in fluid communication with the cooling air supply line. The metering coupon may be configured to passively manage cooling air from the cooling air supply line.

In various embodiments, the metering coupon may be located within the cooling air supply line. The component may comprise at least one of a turbine vane, a turbine blade, a blade outer air seal, or a combustor panel. The metering coupon may be located within a film hole in the component. The metering coupon may comprise at least one of nickel or zirconium tungstate. The metering coupon may be configured to increase airflow in response to an increase in temperature.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
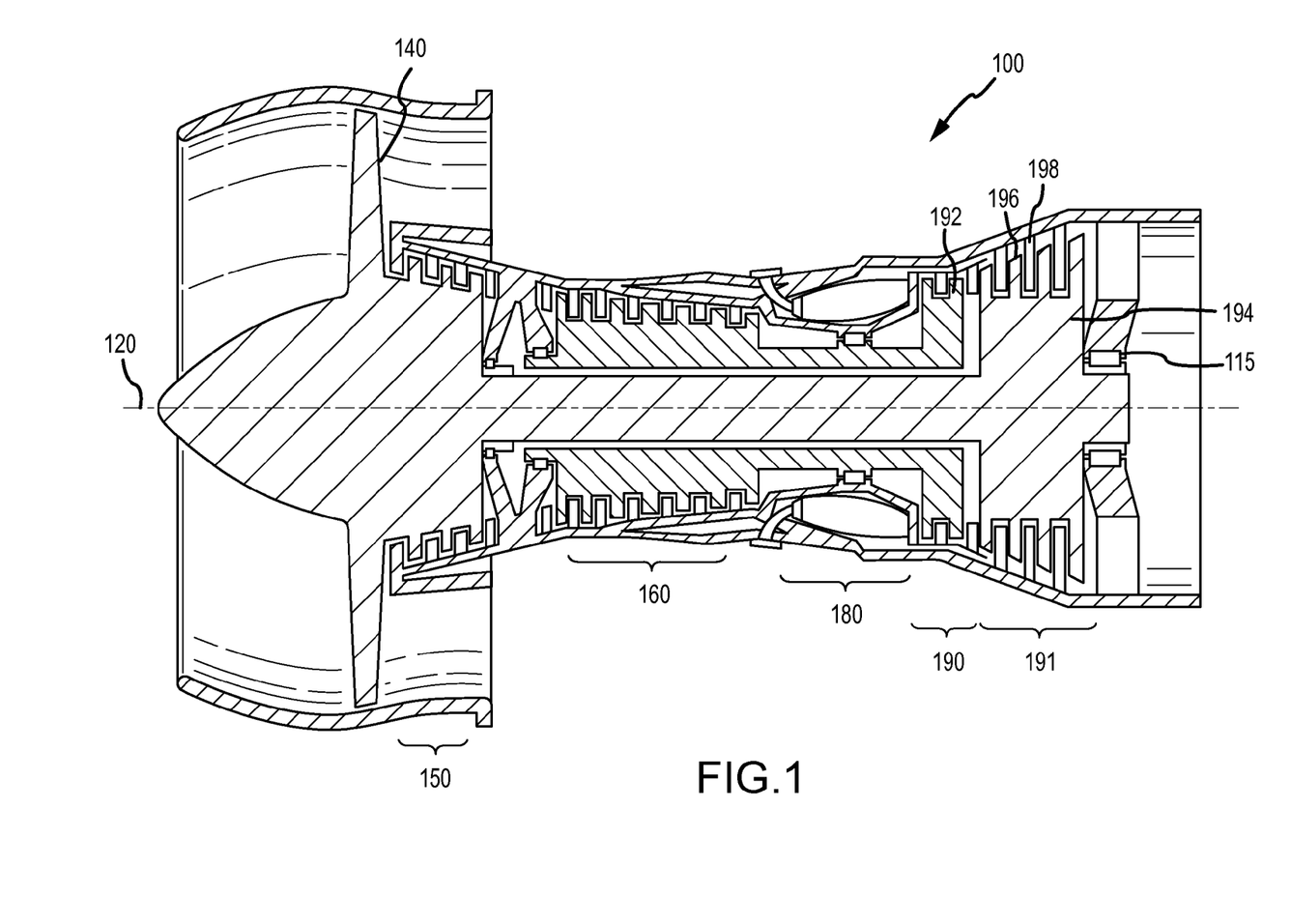
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
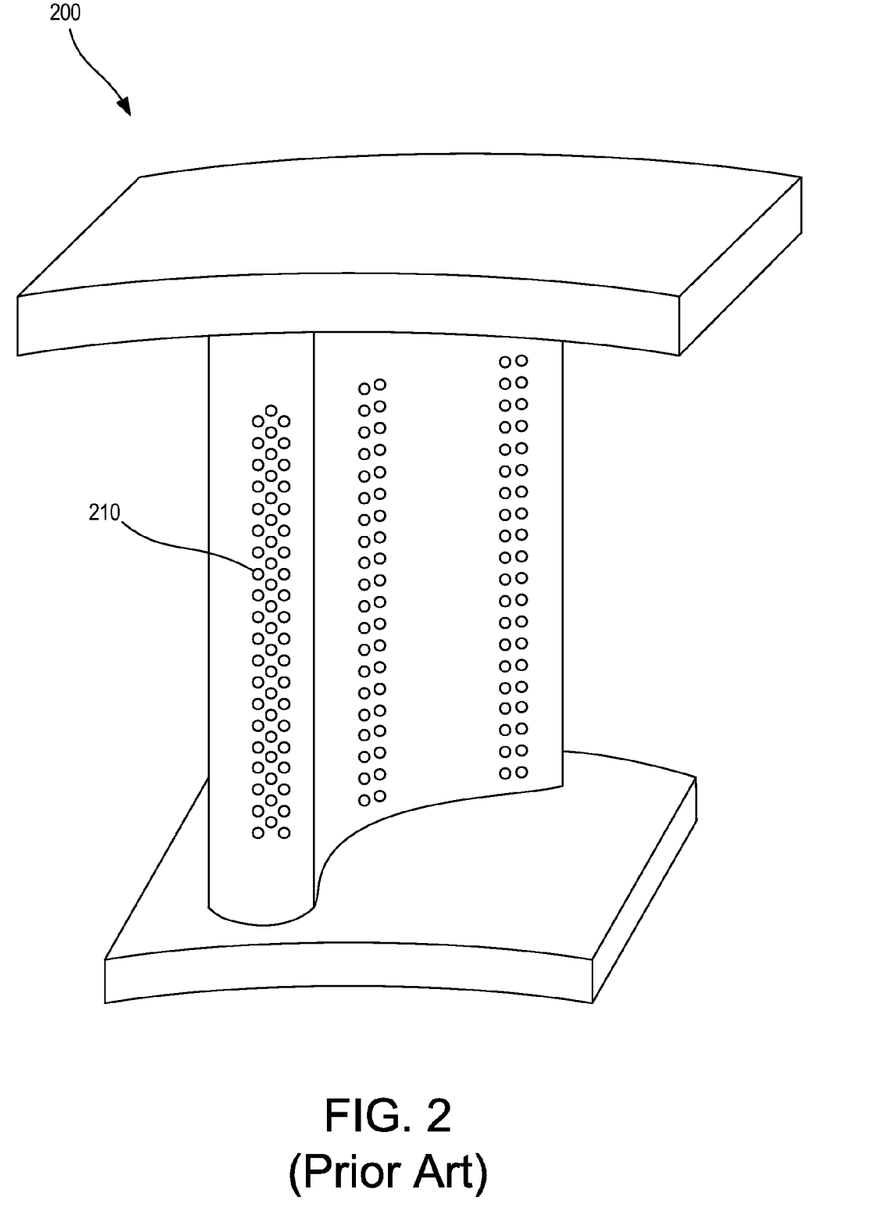
FIG. 2 illustrates a perspective view of a borescope inspection plug in accordance with various embodiments.

Referring to FIG. 2, a perspective view of a turbine vane 200 is illustrated according to various embodiments. The turbine vane 200 may comprise a plurality of film holes 210. Cooling air may be directed through the interior of the turbine vane 200 and out the film holes 210. The cooling air may form a thin protective layer around the turbine vane 200 which protects the turbine vane 200 from extreme high temperatures.

The temperatures experienced by the turbine vane 200 and other engine components may be highest during takeoff, and may decrease during steady flight at cruise altitude. At the highest temperatures, more cooling air may be desirable to protect the turbine vane 200. However, the turbine vane 200 may expand with increasing temperatures due to the coefficient of thermal expansion of the material of the turbine vane 200. As the turbine vane 200 expands, an area of the film holes 210 may decrease. The decreasing area of the film holes 210 may result in less cooling air flowing through the film holes 210, decreasing the effectiveness of the protective layer of cooling air around the turbine vane 200.

In some cases, the supply of cooling air may be actively managed in order to increase the flow rate of cooling air or pressure of cooling air during high temperature periods. However, it may be desirable to passively manage the supply of cooling air. A material having a negative coefficient of thermal expansion may be utilized in order to passively manage the cooling air, such that the supply of cooling air does not need to be affected.

Figure 3:
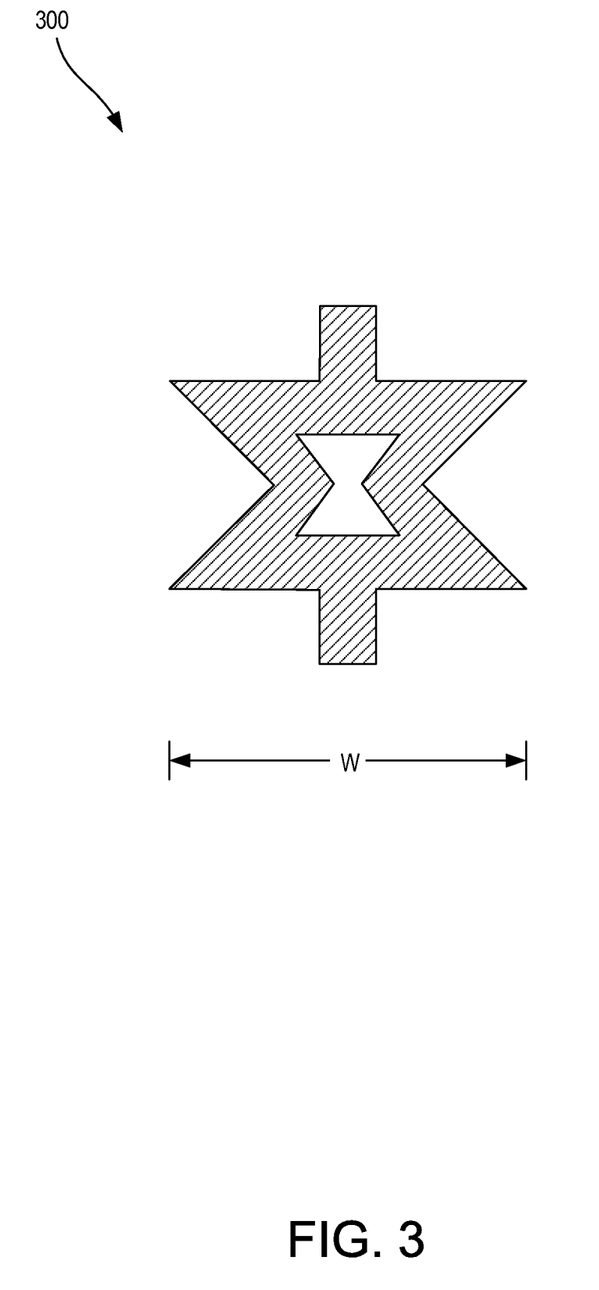
FIG. 3 illustrates a unit cell for a material having a negative coefficient of thermal expansion in accordance with various embodiments.

Referring to FIG. 3, a unit cell 300 for a material having a negative coefficient of thermal expansion is illustrated according to various embodiments. In various embodiments, the material may comprise nickel, a nickel alloy, molysilicide nickel aluminide, zirconium tungstate, or any other suitable material. In various embodiments, the material may be fabricated using additive manufacturing. The material may be fabricated using selective laser sintering or direct metal laser sintering, in which a laser fuses powdered metal into a solid part. The unit cell 300 shown in FIG. 3 is merely one example of a unit cell that may be used to form a material having a negative coefficient of thermal expansion, and those skilled in the art will appreciate that many different shapes may be used. In various embodiments, unit cell 300 may have a width W of less than 1 cm (0.4 inches), less than 1 mm (0.04 inches), or less than 100 microns (0.004 inches). However, in various embodiments, width W may be any suitable size.

Figure 4:
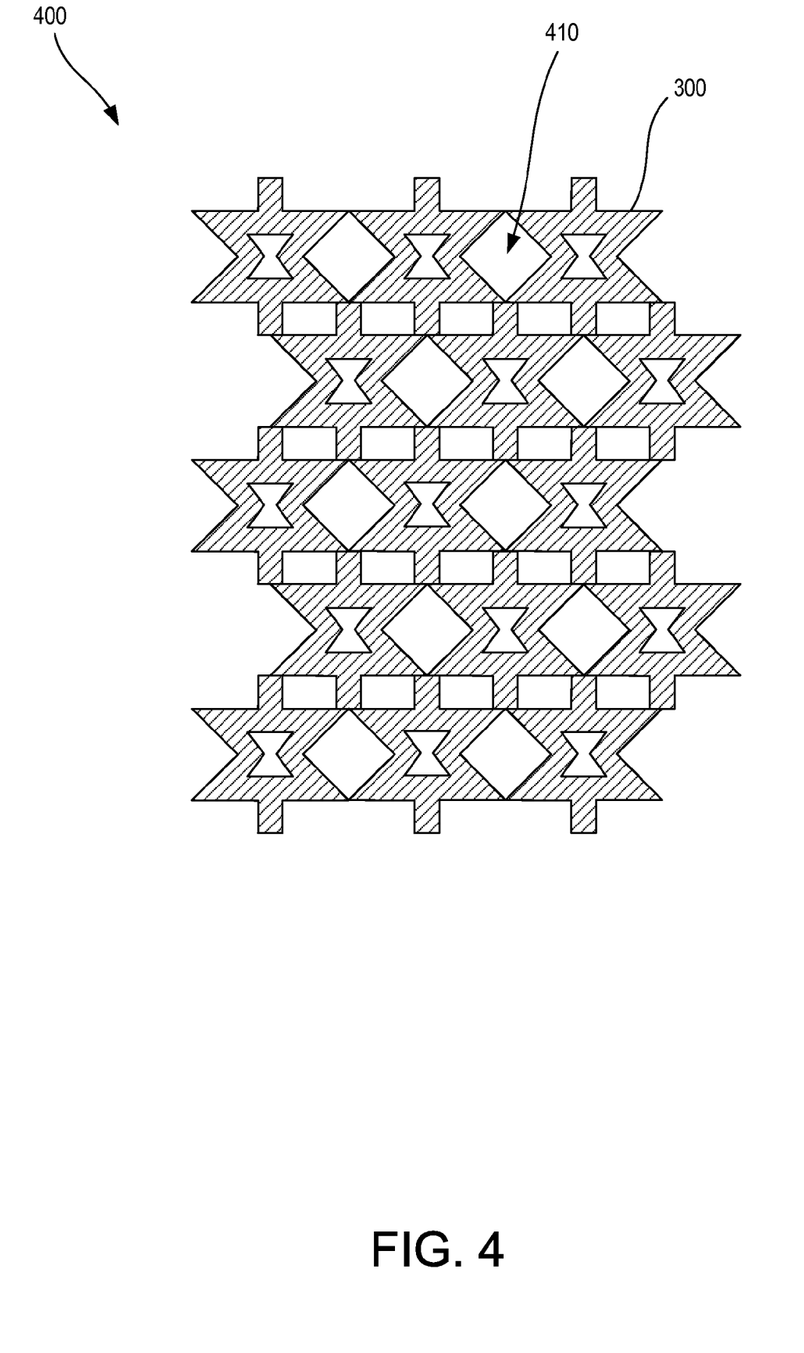
FIG. 4 illustrates a lattice of a material having a negative coefficient of thermal expansion in accordance with various embodiments.

Referring to FIG. 4, a lattice 400 of a material having a negative coefficient of thermal expansion is illustrated according to various embodiments. The unit cell 300 from FIG. 3 may be formed in a repetitive pattern. The pattern may cause the lattice 400 to contract as a temperature of the material increases. As the temperature increases, a cross-sectional area of pores 410 between unit cells 300 may increase, allowing for increased air flow through the pores 410.

Figure 5:
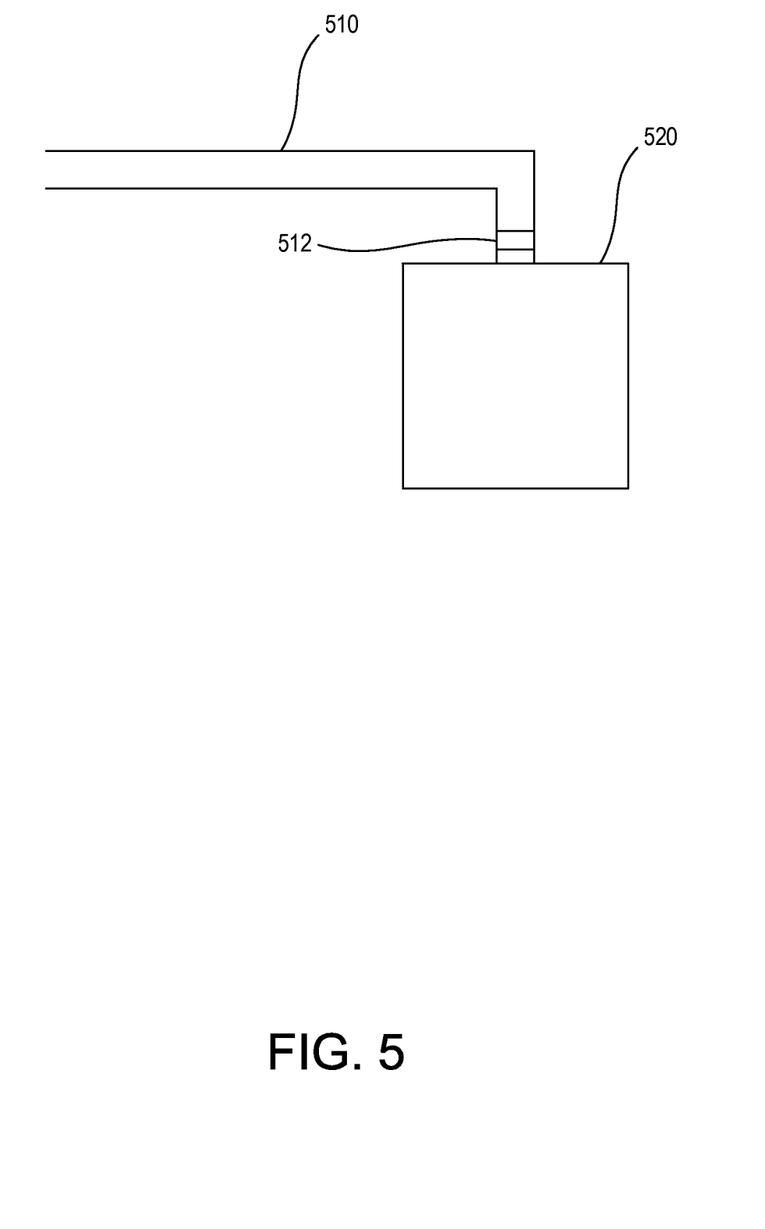
FIG. 5 illustrates a schematic view of a cooling air supply line in accordance with various embodiments.

Referring to FIG. 5, a schematic view of a cooling air supply line 510 to a component 520 is illustrated according to various embodiments. The component 520 may comprise any component in a gas turbine engine which utilizes cooling air, such as a turbine vane, a turbine blade, a blade outer air seal, or a combustor panel. The cooling air supply line 510 may comprise a metering coupon 512. The metering coupon 512 may comprise a material having a negative coefficient of thermal expansion. In response to a temperature of the metering coupon 512 increasing, the cross-sectional area of the metering coupon 512 may decrease, allowing a greater volume of cooling air per unit time to be supplied to the component 520.

Figure 6:
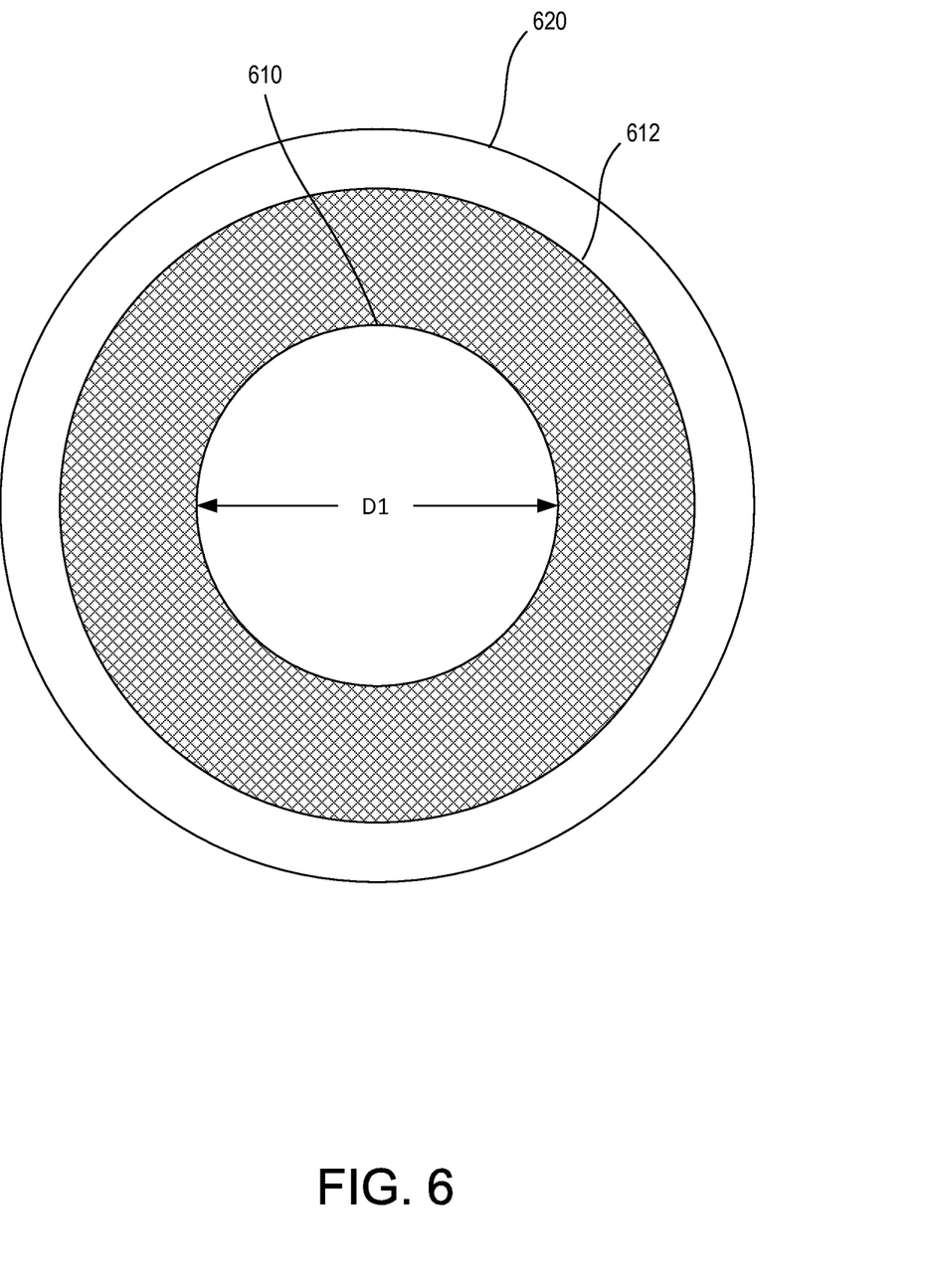
FIG. 6 illustrates a cross-section view of a metering coupon in accordance with various embodiments.

Referring to FIG. 6, a cross-section view of a metering coupon 612 is illustrated according to various embodiments. The metering coupon 612 may be located within a cooling air supply line 620. The metering coupon 612 may comprise an aperture 610 having a diameter D1. Cooling air may flow through the aperture 610. In response to the metering coupon 612 increasing in temperature, the metering coupon 612 may contract, and the diameter D1 of the aperture 610 may increase. Thus, in periods of relatively higher temperatures, the metering coupon 612 may allow more cooling air to flow through the metering coupon 612 in order to cool a component.

Figure 7:
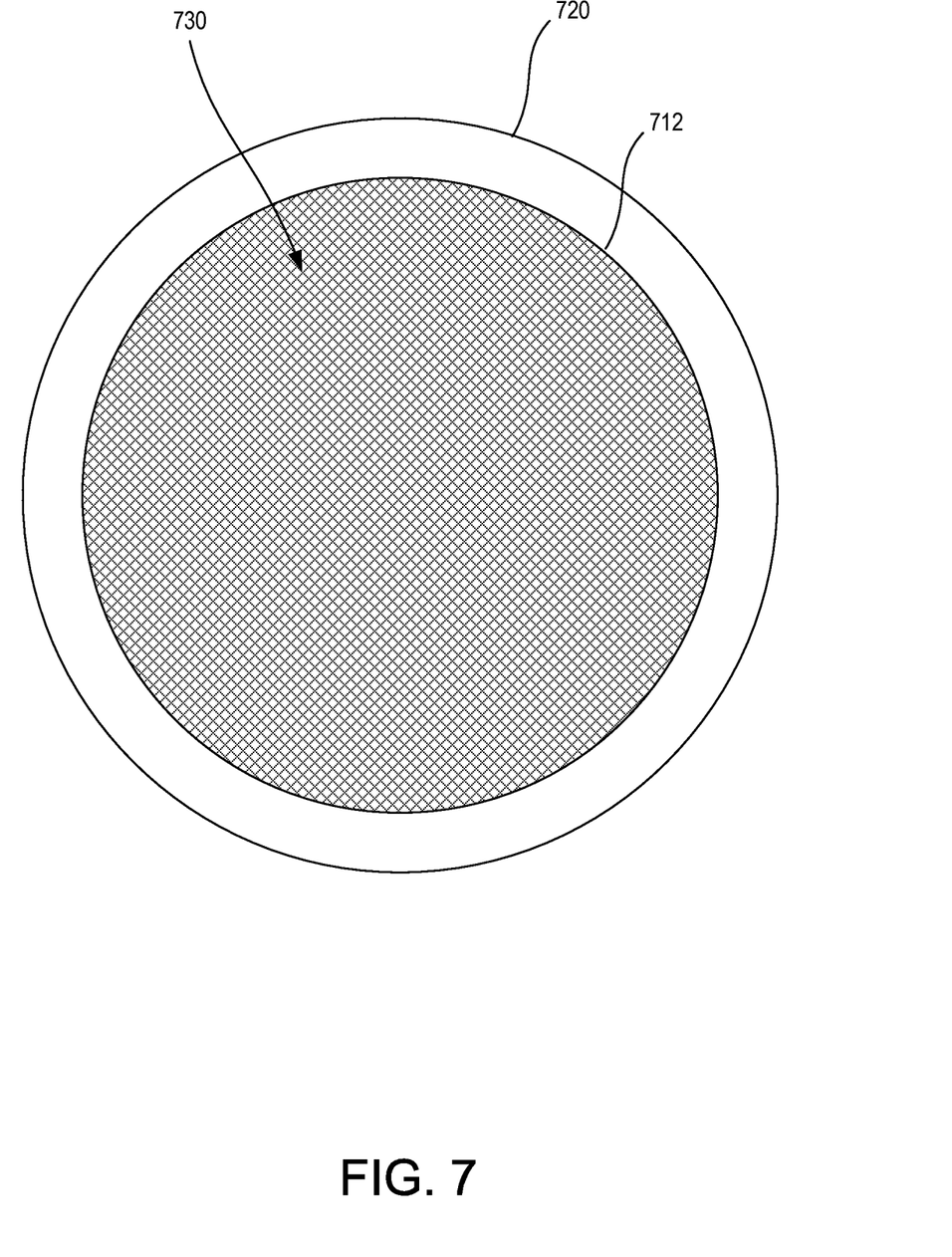
FIG. 7 illustrates a cross-section view of a metering coupon which spans an entire cooling air supply line in accordance with various embodiments.

Referring to FIG. 7, a cross-section view of a metering coupon 712 which spans the entire cooling air supply line 720 is illustrated according to various embodiments. The metering coupon 712 may comprise a plurality of pores 730. In various embodiments, the metering coupon 712 may comprise a cross-section as described with reference to FIG. 4. As the temperature of the metering coupon 712 increases, the cross-sectional area of the pores 730 may increase, allowing more cooling air to flow through the metering coupon 712.

Figure 8:
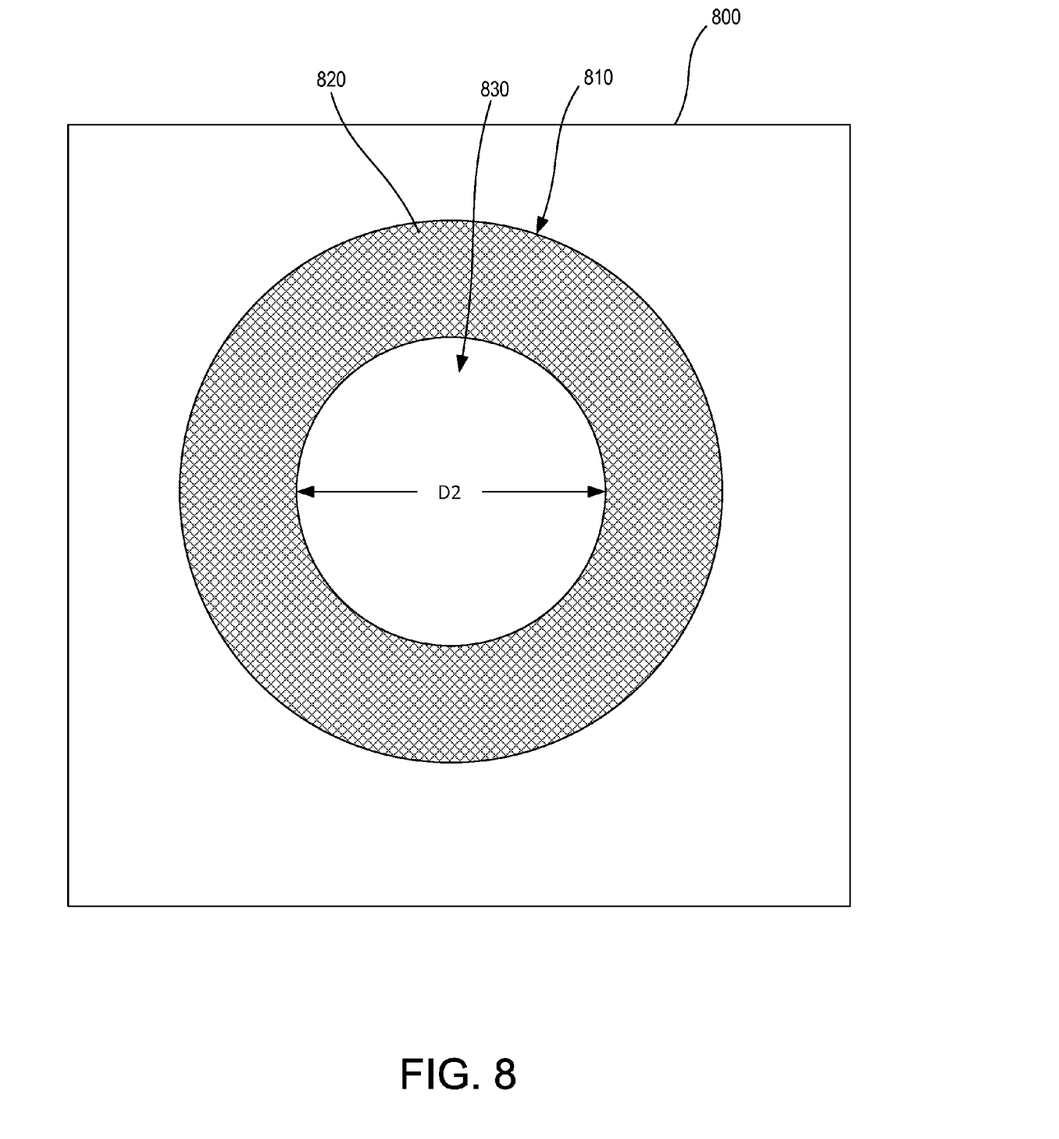
FIG. 8 illustrates a close-up view of a film hole in accordance with various embodiments.

Referring to FIG. 8, a close-up view of a film hole 810 is illustrated according to various embodiments. Film hole 810 may be in a gas turbine engine component 800. The gas turbine engine component 800 may be any component in a gas turbine engine which utilizes film holes, such as a turbine vane, turbine blade, blade outer air seal, or combustor panel. Film hole 810 may comprise a metering coupon 820 comprising a material having a negative coefficient of thermal expansion. The metering coupon 820 may comprise an aperture 830 having a diameter D2. In response to an increase in temperature of the turbine component 800, the metering coupon 820 may contract, and the diameter D2 may increase, allowing for additional cooling air to flow through the aperture 830 to protect the gas turbine engine component 800. In various embodiments, the metering coupon 820 may be coated onto the film hole 810. In various embodiments, metering coupon 820 may span the entire cross-section of the film hole 810.

The specific materials, configurations, and locations of materials having a negative coefficient of thermal expansion disclosed herein are merely examples of the present disclosure. Those skilled in the art will recognize that materials having a negative coefficient of thermal expansion may be utilized in a variety of configurations in order to passively manage the supply of cooling air within a gas turbine engine.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A cooling system in a gas turbine engine comprising:
a component in the gas turbine engine;
a cooling air supply line configured to supply cooling air to the component; and
a metering coupon comprising a lattice of a plurality of unit cells formed of a material having a negative coefficient of thermal expansion, wherein each of the unit cells shares a geometric shape and the lattice has pores formed between the unit cells through which the cooling air flows.

2. The cooling system of claim 1, wherein the metering coupon is located within the cooling air supply line.

3. The cooling system of claim 1, wherein the metering coupon is located within a film hole in the component.

4. The cooling system of claim 1, wherein the component comprises at least one of a vane, a blade, a blade outer air seal, or a combustor panel.

5. The cooling system of claim 1, wherein the metering coupon spans an entire cross-section of the cooling air supply line.

6. The cooling system of claim 1, wherein the metering coupon is coated on a film hole in the component.

7. The cooling system of claim 1, wherein the metering coupon is configured to passively manage cooling air supplied to the component.

8. The cooling system of claim 1, wherein the metering coupon comprises at least one of nickel or zirconium tungstate.

9. A gas turbine engine component comprising:
a film hole; and
a lattice comprising a plurality of unit cells formed of a material having a negative coefficient of thermal expansion located within the film hole, wherein each of the unit cells shares a geometric shape and the lattice has pores formed between the unit cells through which a cooling fluid flows.

10. The gas turbine engine component of claim 9, wherein the material comprises at least one of nickel or zirconium tungstate.

11. The gas turbine engine component of claim 9, wherein the material is configured to passively manage cooling air flowing through the film hole.

12. The gas turbine engine component of claim 9, wherein the material is coated on the film hole.

13. The gas turbine engine component of claim 9, wherein the material spans an entire cross-section of the film hole.

14. The gas turbine engine component of claim 9, wherein the gas turbine engine component is at least one of a turbine vane, a turbine blade, a blade outer air seal, or a combustor panel.

15. A gas turbine engine comprising:
a component in the gas turbine engine;
a cooling air supply line in fluid communication with the component; and
a metering coupon comprising a lattice of a plurality of unit cells formed of a material having a negative coefficient of thermal expansion, wherein each of the unit cells shares a geometric shape and the lattice has pores formed between the unit cells through which cooling air flows, wherein the metering coupon is in fluid communication with the cooling air supply line, and wherein the metering coupon is configured to passively manage the cooling air from the cooling air supply line.

16. The gas turbine engine of claim 15, wherein the metering coupon is located within the cooling air supply line.

17. The gas turbine engine of claim 15, wherein the component comprises at least one of a turbine vane, a turbine blade, a blade outer air seal, or a combustor panel.

18. The gas turbine engine of claim 15, wherein the metering coupon is located within a film hole in the component.

19. The gas turbine engine of claim 15, wherein the metering coupon comprises at least one of nickel or zirconium tungstate.

20. The gas turbine engine of claim 15, wherein the metering coupon is configured to increase airflow in response to an increase in temperature.

* * * * *